Patented July 7, 1953

2,644,261

UNITED STATES PATENT OFFICE 2,644,261

METHOD OF REVIVING PICTURES AND THE RESULTANT ARTICLES

Paul C. Goetz, Omaha, Nebr., assignor of one-half to Carlos Cudell Goetz, New York, N. Y.

No Drawing. Application December 27, 1948, Serial No. 67,545

6 Claims. (Cl. 41—27)

This invention relates generally to a composition for treatment of pictorial representations on different types of media to induce freshness, enhance clarity, depth and beauty, and to preserve these effects.

It has been customary in the past to treat paintings and other types of pictorial representations for protection against moisture and for improving vibratory effects to the various tints, colors or shades by the application of varnish as conventionally prepared from copal, dammar, mastic and other natural gums. However, varnish per se has certain adverse qualities such as streaking and causing surface glare when applied for these purposes. In addition the varnishes with time become dim and crack because of the brittleness thereof.

In the removal of dull and cracked varnish, injury to the pictorial representation especially paintings usually results.

Mineral waxes, paraffins and Vaseline oil have been used as a substitute for varnishes in an effort to overcome the shortcomings thereof. Mineral waxes and paraffin have also proved to be brittle while Vaseline oils, although giving an excellent effect especially to oil paintings because of penetration of the cracks, are non-drying oils. Vaseline, therefore, is impractical because dirt is collected and held with tenacity. It is difficult to remove the dirt from the Vaseline and to remove the Vaseline itself by use of solvents is also difficult.

Applicant has found that the revivification effect of Vaseline oil and the enduring quality of natural or synthetic varnishes may be combined by the application of one or more of the higher aliphatic alcohols in suspension, emulsion or solution with said varnish to the face of pictorial representations. By the expression pictorial representations are included paintings on paper, cloth and wood, prints, photographic copies, pencil sketches and painted wood carvings; and in addition the term particularly includes photographic negatives wherein the composition has utility for repairing scratches in the gelatin.

As examples of the higher alcohols in combination with varnish and which may contain up to three hydroxylic groups, may be mentioned cetyl alcohol, octadecanol, and octadecandiol. Under the influence of one or more of these alcohols, the varnish composition makes existing cracks in the painting or picture surface less noticeable or which tend to disappear, the picture surface losing all dullness and acquiring new life and depth of perspective.

The beneficial effect of the higher aliphatic alcohols with natural or synthetic varnish and the adverse effect of natural or synthetic varnish or resins without said alcohols seem to bear a direct relationship with the low refractive indices of the said alcohols and the high refractive indices of the varnish or resins.

Thus, where a picture is provided with a protective layer or covering on the surface by a transparent material possessing a high refractive index, light falling sideways and hitting the surface at a low angle will be reflected. With light falling from all sides and at all angles on the surface and with a condition of unevenness of the surface which is invariably incidental to that of an oil painting, light will be reflected in all directions giving rise to gloss or glare. This gloss or glare is always a concomitant of varnished pictures or pictures framed in glass.

Conversely, a beautiful effect is obtained on a picture old, dull and cracked when the surface is covered with a thin layer of turpentine or even water. Under such circumstances the cracks disappear, the surface becomes vitalized and colors ordinarily hidden reappear. The reason for this phenomenon is that turpentine has substantially the same refractive index as linseed oil and water and when the cracks are filled therewith there is hardly any reflection of light within. The lower refractive index also reduces surface glare. However these effects are only temporary since turpentine and water rapidly vaporize.

Advantages of the composition of the invention herein may be set forth as follows:

a. The alcohols are in a pure state and colorless even when in suspension, emulsion or solution form with the varnish and detract from the coloring thereof.

b. The alcohol content does not change by exposure to atmospheric conditions such as moisture, and oxygen does not cause polymerization; and hence the deterioration rate of the varnish diluted with the alcohol is reduced.

c. These alcohols are chemically neutral and do not react with the pigments of paints and other surface materials because of chemical inertness and reduce the reactant powers of the varnish combined therewith.

The higher alcohols are insoluble in water but may be emulsified by standard emulsifiers. They are soluble in such solvents as toluene, pinene and dipentene.

Examples of the varnishes prepared and the results obtained are as follows:

*Example 1*

250 grams of Batavia dammar and 50 grams of chlorinated synthetic rubber were dissolved in pinene and made up to one liter. The solution was permitted to stand for several weeks to permit turbidity to settle out. The resulting varnish had a good body and upon drying gave a film of good transparency, but the film appeared too shiny. This formula was repeated with the addition of ten grams of cetyl alcohol, and the result was that upon drying a less shiny film was produced. When the formula was repeated again with twenty grams of cetyl alcohol instead of ten, the resulting film was free from any disturbing glare, and when the cetyl alcohol was increased to 30 grams, the drying of the varnish was retarded.

*Example 2*

150 grams of Batavia dammar were dissolved in toluene made up to one liter. The solution was permitted to settle for several weeks and then it was applied to a picture. The solution was slightly turbid upon application. However, upon drying it gave a clear shiny film. The same formula was repeated with the addition of 10, 20 and 30 grams of octadecanol. The addition of octadecanol made the solution clear and decreased the glare of the dry film in proportion to the amounts of octadecanol added.

*Example 3*

200 grams of polystyrene and 50 grams of octadecandiol were dissolved in dipentene and made up to one liter. A clear solution was obtained which on drying gave a hard film free of glare.

*Example 4*

250 grams of an alkyd type of synthetic resin, 10 grams of chlorinated synthetic rubber and 30 grams of cetyl alcohol were dissolved in dipentene and made up to one liter. The solution was clear, did not need filtration, did not settle and gave upon drying a clear dry film free of glare.

As a result of the application of the compositions to surfaces as set forth in the above examples the following advantageous properties were observed:

*a.* The liquids did not remove retouching colors from photographs although they removed retouching pencil marks. The liquids can therefore be applied over photographic copies retouched with colors. The treated photograph pictures will take retouching colors and pencil marks on the treated surface.

*b.* There was no difficulty in applying several coats, one above the other.

*c.* The coats proved highly repellant to water and showed no signs of weakening under the influence of water.

*d.* The coats showed no signs of aging or weakening or any change whatever within a protracted period.

It is understood that the expression picture wherever used embraces painting on paper, cloth and wood, frescoes, prints, photographic copies, pencil sketches and wood carvings especially if artistic and painted. The application of the same liquids to photographic negatives also produces beneficial results.

It has been found that any one or a mixture of at least two higher aliphatic alcohols with the varnish, and each having in excess of 14 carbon atoms in its molecule and up to three hydroxyl groups can be applied to a picture surface.

I claim:

1. In combination, a surface comprising a pictorial representation formed from pigments and pigmented photographic emulsions, and a colorless, transparent, non-glaring, uniform and inert coating for said surface to preserve said representation against atmospheric conditions and to improve the clarity thereof, said coating consisting of a homogeneous layer of a member selected from the group consisting of cetyl alcohol, octadecanol and octadecandiol, a varnish and a common solvent therefor, said solvent being common to said varnish and alcohol, the proportion of the alcohol to the varnish being one part alcohol to a selective range of 4 to 15 parts varnish.

2. In combination, a surface comprising a pictorial representation formed from pigments and pigmented photographic emulsions, and a colorless, transparent, non-glaring, uniform and inert coating for said surface to preserve said representation against atmospheric conditions and to improve the clarity thereof, said coating consisting of a homogeneous layer of cetyl alcohol, varnish and a common solvent therefor selected from the group consisting of toluene, pinene and dipentene, said solvent being common to the said alcohol and varnish, the proportion of the alcohol to the varnish being from one part alcohol to a range of 8.33 to 15 parts of varnish.

3. In combination, a surface comprising a pictorial representation formed from pigments and pigmented photographic emulsions, and a colorless, transparent, non-glaring, uniform and inert coating for said surface to preserve said representation against atmospheric conditions and to improve the clarity thereof, said coating consisting of a homogeneous layer of octadecanol, varnish and a common solvent therefor selected from the group consisting of toluene, pinene and dipentene, said solvent being common to said varnish and alcohol, the proportion of the alcohol to the varnish being from one part alcohol to a range of 5 to 15 parts of varnish.

4. In combination, a surface comprising a pictorial representation formed from pigments and pigmented photographic emulsions, and a colorless, transparent, non-glaring, uniform and inert coating for said surface to preserve said representation against atmospheric conditions and to improve the clarity thereof, said coating consisting of a homogeneous layer of octadecandiol, varnish and a common solvent therefor selected from the group consisting of toluene, pinene and dipentene, said solvent being common to said varnish and alcohol, the proportion of alcohol to the varnish being 1 to 4.

5. A process for coating pictorial representations formed from pigments and pigmented photographic emulsions to preserve said representations against atmospheric conditions and to improve the clarity thereof, including the step of applying a composition comprising a resinous varnish, a member selected from the group consisting of cetyl alcohol, octadecanol and octadecandiol and a common solvent for said varnish and alcohol, the proportion of the alcohol to the varnish being one part alcohol to a selective range of 4 to 15 parts varnish.

6. A process for coating pictorial representations formed from pigments and pigmented photographic emulsions to preserve said representations against atmospheric conditions and to improve the clarity thereof, including the step of applying a composition comprising a varnish, a member selected from the group consisting of cetyl alcohol, octadecanol and octadecandiol and a common solvent from the group consisting of toluene, pinene and dipentene, said solvent being common to said varnish and alcohol, the proportion of the alcohol to the varnish being one part alcohol to a selective range of 4 to 15 parts varnish.

PAUL C. GOETZ.

References Cited in the file of this patent

UNITED STATES PATENTS

| Number | Name | Date |
|---|---|---|
| 38,144 | Bodtker | Apr. 14, 1863 |
| 2,045,979 | Crawford | June 30, 1936 |
| 2,446,757 | Goetz | Aug. 10, 1948 |